US009722742B2

(12) United States Patent
Li et al.

(10) Patent No.: US 9,722,742 B2
(45) Date of Patent: Aug. 1, 2017

(54) METHOD AND APPARATUS FOR IMPLEMENTING COORDINATED MULTIPLE POINT TRANSMISSION

(75) Inventors: Yingyang Li, Beijing (CN); Xiaoqiang Li, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 618 days.

(21) Appl. No.: 13/265,661

(22) PCT Filed: Apr. 21, 2010

(86) PCT No.: PCT/KR2010/002489
§ 371 (c)(1),
(2), (4) Date: Oct. 21, 2011

(87) PCT Pub. No.: WO2010/123270
PCT Pub. Date: Oct. 28, 2010

(65) Prior Publication Data
US 2012/0039216 A1    Feb. 16, 2012

(30) Foreign Application Priority Data

Apr. 24, 2009  (CN) .......................... 2009 1 0137077

(51) Int. Cl.
*H04L 5/00*    (2006.01)
*H04B 7/024*   (2017.01)
(Continued)

(52) U.S. Cl.
CPC .......... *H04L 5/0032* (2013.01); *H04L 5/0035* (2013.01); *H04B 7/024* (2013.01);
(Continued)

(58) Field of Classification Search
CPC ......... H04W 72/0426; H04W 72/0433; H04W 72/082; H04W 92/12
(Continued)

(56) References Cited

U.S. PATENT DOCUMENTS

| 2006/0111110 A1 | 5/2006 | Schwarz et al. |
| 2009/0238064 A1* | 9/2009 | Lee ........................ H04L 27/262 370/208 |

(Continued)

FOREIGN PATENT DOCUMENTS

| CN | 101373999 A | 2/2009 |
| WO | 2010-025148 A1 | 3/2010 |

OTHER PUBLICATIONS

3GPP TSG-RAN WG1 #56bis, R1-091450, "RS Structure in Support of Higher-order MIMO", Mar. 23-27, 2009, pp. 1-10.*
(Continued)

*Primary Examiner* — Scott M Sciacca
(74) *Attorney, Agent, or Firm* — Jefferson IP Law, LLP

(57) ABSTRACT

The present invention discloses a method for implementing coordinated multiple point transmission CoMP, including: configuring, by the network side, a range setting group to a user equipment, UE, and acquiring the original mapping pattern of various cells in the group; receiving the channel information of various cells in the group returned by the UE; selecting, by the network side, cells for practically sending data to the UE currently, determining the update mapping patterns for the cells selected in the group performing CoMP, and controlling the selected various cells to send a physical downlink shared channel to the UE according to the update mapping pattern. The present invention further discloses an apparatus for implementing CoMP In accordance with the method and apparatus for implementing CoMP of the present invention, the mapping patterns of the cells for practically sending data to a UE are updated by acquiring the CRS and CSI-RS mapping locations of the original mapping pattern of cells of the range setting group to get the update mapping pattern for use in the CoMP, so that it is possible (Continued)

to meet the design principle of CRS and CSI-RS and guarantee the normal application of CoMP at the same time.

20 Claims, 2 Drawing Sheets

(51) Int. Cl.
| | | |
|---|---|---|
| H04B 7/06 | (2006.01) | |
| H04W 24/02 | (2009.01) | |
| H04W 24/10 | (2009.01) | |
| H04W 48/08 | (2009.01) | |
| H04W 48/20 | (2009.01) | |

(52) U.S. Cl.
CPC ........... *H04B 7/0626* (2013.01); *H04W 24/02* (2013.01); *H04W 24/10* (2013.01); *H04W 48/08* (2013.01); *H04W 48/20* (2013.01)

(58) Field of Classification Search
USPC .......................... 370/329, 348; 455/69, 452.2
See application file for complete search history.

(56) References Cited

U.S. PATENT DOCUMENTS

| | | | |
|---|---|---|---|
| 2010/0033374 A1* | 2/2010 | van Rensburg et al. ..... | 342/368 |
| 2010/0056215 A1 | 3/2010 | Gorokhov et al. | |
| 2010/0091893 A1* | 4/2010 | Gorokhov .................... | 375/260 |
| 2010/0189038 A1* | 7/2010 | Chen et al. ................... | 370/328 |
| 2010/0232336 A1* | 9/2010 | Choudhury et al. .......... | 370/312 |
| 2010/0238821 A1 | 9/2010 | Liu et al. | |
| 2011/0183669 A1* | 7/2011 | Kazmi ........................... | 455/434 |
| 2011/0199986 A1* | 8/2011 | Fong et al. ................... | 370/329 |
| 2011/0237270 A1* | 9/2011 | Noh et al. ..................... | 455/450 |
| 2011/0317641 A1* | 12/2011 | Noh et al. ..................... | 370/329 |
| 2012/0115497 A1* | 5/2012 | Tolli et al. ................. | 455/452.2 |

OTHER PUBLICATIONS

A. Papadogiannis et al., A Dynamic Clustering Approach in Wireless Networks with Multi-Cell Cooperative Processing, ICC 2008, Beijing, May 19-23, 2008, pp. 4033-4037.

Samsung: :Design Considerations for COMP Joint Transmission, 3GPP Draft; R1-091232 Design Considerations for COMP Joint Transmission, 3rd Generation Partnership Project(3GPP), No. Seoul, Korea; Mar. 18, 2009, Mar. 18, 2009, XP050338846, [Retrived on Mar. 18, 2009].

Texas Instruments: Multiplexing and Signaling Support for Downlink COMP, 3GPP Draft; R1-091292 TI DL COMP, 3rd Generation Partnership Project (3GPP), No. Seoul, Korea; Mar. 18, 2009, Mar. 18, 2009 (Mar. 18, 2009), XP050338899, [retrieved on Mar. 18, 2009].

Fujitsu: "Efficient HARQ Protocol for SIC based DL COMP", 3GPP Draft; R1-091496, 3rd Generation Partnership Project (3GPP), vol. RAN WG1, No. Seoul, Korea; Mar. 23, 2009, Mar. 18, 2009 (Mar. 18, 2009), XP050417734, [retrieved on Mar. 18, 2009].

"3rd Generation Partnership Project; Technical Specification Group Radio Access NetWork; Evolved Universal Terrestrial Radio Access (E-UTRA); Physical Channels and Modulation (Release 8)", 3GPP Standard; 3GPP TS 36.211, 3rd Generation Partnership Project (3GPP), No. V8.6.0, Mar. 1, 2009 (Mar. 1, 2009) pp. 1-83, XP050377538.

Huawei et al., Solutions for DL CoMP Transmission-For Issues on Control Zone, CRS and DRS, 3GPP Draft, R1-090821, Feb. 5, 2009.

\* cited by examiner

METHOD AND APPARATUS FOR IMPLEMENTING COORDINATED MULTIPLE POINT TRANSMISSION

TECHNICAL FIELD

The present invention relates to the field of mobile communication, and particularly to a method and apparatus for implementing coordinated multiple point transmission.

BACKGROUND ART

In a LTE evolution system (LTE-A), A primary technology, to support a higher cell average throughput and a higher cell border throughput, is coordinated multiple point transmission (CoMP). According to the present discussion, there are two types of CoMP technologies including coordinated multiple point scheduling (CoMP CS) and coordinated multiple point joint processing (CoMP JP). To CoMP CS, the data of user equipment (UE) is from a sending node, i.e. serving cell while signals sent by other sending nodes are equivalent to interference. So that, it is necessary to perform a coordinated scheduling between multiple sending nodes to control the interference level; to CoMP JP, multiple sending nodes send data to a UE at the same time-frequency resource location, so that it is possible to improve the signal-to-noise ratio of UE signal and reduce the interference.

In a mobile communication system, a set of cells measured by a UE, i.e. measuring group is configured in the network to support operations such as radio resource management. At the same time, to CoMP, it is necessary for the network to determine which sending nodes sending signals to a UE. In the current standards, two cell group concepts, associated with CoMP, are defined. To a UE working in the mode of CoMP (referred to as CoMP UE in general), a set of cells, to be measured and of which the channel information should be reported, are configured in the network. The set of cells are referred to as report set. At the same time, report sets corresponding to the different UEs include the different cells. The number of cells included in a reporting set determines the overhead of a UE sending an uplink signaling of channel feedback information. Since the number of cells included in the reporting set may be large, a CoMP UE may also select to only report the channel information of a part of cells in a reporting set. The part of cells is regarded by the network as a set of cells for practically sending signals to a UE, which is referred to as cooperating set. It is easily understood that, to the same UE, its cooperating set may be the same as its reporting set, or a subset of its reporting set.

In a LTE-A system, there are two types of common reference signals, one is a CRS for use in channel estimation, the type of signal follows the structure defined in the LTE system; the other one is a reference signal (CSI-RS) for use in channel measurement, the type of signal is a new signal type defined in the LTE-A system. A design principle for CRS and CSI-RS requires the adjacent cells sending the CRS and CSI-RS at the different time-frequency resource, so that there is no interference among the CRS and CSI-RS sent by the adjacent cells. The advantage brought by this design principle is that, the adjacent cells may respectively improve the transmit powers of their CRS and CSI-RS, so as to improve the precision of channel estimation and channel measurement.

DISCLOSURE OF INVENTION

Technical Problem

According to the above design principle, the adjacent two cells need to configure the mapping patterns for sending the CRS and CSI-RS at the different time-frequency resource location (i.e. the adjacent two cells need to configure two different mapping patterns, wherein the mapping location of CRS and CSI-RS in a mapping pattern is not overlapped by that in the other mapping pattern); when a cell sends a CRS or CSI-RS at a resource element (RE), an adjacent cell sends data at the RE.

On the other hand, for CoMP JP, it is required that, multiple sending nodes send data to a CoMP UE at the same time-frequency resource location; so that, when a cell sends data at a RE, it is required that other cells send data at the same RE by the CoMP technology.

Obviously, in this case, it is impossible to not only meet the design principle of CRS and CSI-RS but also meet the requirement of CoMP. Since the method solving the problem is not given definitely in the current standards, it is impossible to provide a scheme not only meeting the design principle of CRS and CSI-RS but also guaranteeing the normal application of CoMP in the prior art.

Solution to Problem

The present invention provides a method and apparatus for implementing coordinated multiple point transmission CoMP, which is able to meet the design principle of CRS and CSI-RS and guarantee the normal application of CoMP at the same time.

To attain the above objective, the specific solution in accordance with the present invention is as follows: A method for implementing coordinated multiple point transmission, including: configuring, by the network side, a range setting group to a user equipment, UE, and acquiring the original mapping pattern of various cells in the group; the rang setting group is a measuring set, reporting set or cooperating set; receiving the channel information of various cells in the group returned by the UE; selecting, by the network side, cells for practically sending data to the UE currently, determining the update mapping patterns for the cells selected in the group performing the CoMP, and controlling the selected various cells to send a physical downlink shared channel to the UE according to the update mapping pattern.

An apparatus for implementing coordinated multiple point transmission, including: original setting module for configuring a range setting group to a user equipment, UE, and acquiring the original mapping patterns of various cells in the group; the rang setting group is a measuring set, reporting set or cooperating set; channel information receiving module for receiving the channel information of various cells in the group returned by the UE; mapping pattern update transmit module for selecting cells for practically sending data to the UE currently, determining the update mapping patterns for the cells selected from the group performing the CoMP, and controlling the selected various cells to send a physical downlink shared channel to the UE according to the update mapping pattern.

It can be seen from the foregoing scheme that, in the method and apparatus for implementing CoMP in accordance with embodiments of the present invention, the mapping patterns of the cells for practically sending data to a UE are updated by acquiring the CRS and CSI-RS mapping locations of the original mapping pattern of cells of the range setting group to get the update mapping pattern for use in the CoMP, so that it is possible to make the CRS and CSI-RS mapping locations of the cells for practically sending data to a UE are different and guarantee that various cells are able to perform the CoMP at the same RE location, thereby meeting the design principle of CRS and CSI-RS and the normal application of CoMP.

Advantageous Effects of Invention

According to the present invention, the mapping patterns of the cells for practically sending data to a UE are updated by acquiring the CRS and CSI-RS mapping locations of the original mapping pattern of cells of the range setting group to get the update mapping pattern for use in the CoMP JP, so that it is possible to make the CRS and CSI-RS mapping locations of the cells for practically sending data to a UE are different and guarantee that various cells are able to perform the CoMP JP at the same RE location, thereby meeting the design principle of CRS and CSI-RS and the normal application of CoMP JP. In addition, for the CSI-RS, since it is possible to guarantee the time-frequency resource locations for various cells sending CSI-RS are different, so as to guarantee the interference is small when the signal is sent; since the signal is used for channel measurement after being received by a UE, it is possible to improve the precision for the UE measuring a cell having weak signals in accordance with embodiments of the present invention.

MODE FOR THE INVENTION

The present invention is further explained hereinafter with reference to the accompanying drawings as well as embodiments so as to make the objective, the technical solution and merits thereof more apparent. At the same time, the detailed description of the well known function or structure is omitted in the following description so as to avoid that the description of the present invention is tediously long.

The core idea of the present invention is to further adjust the original mapping patterns of various cells during coordinated multiple point joint processing (CoMP JP), so as to guarantee that downlink data are mapped to the RE that can be used by various cells at the same time. So that it is possible to not only meet the design principle of CRS and CSI-RS but also guarantee the normal application of CoMP JP.

Figure 1:
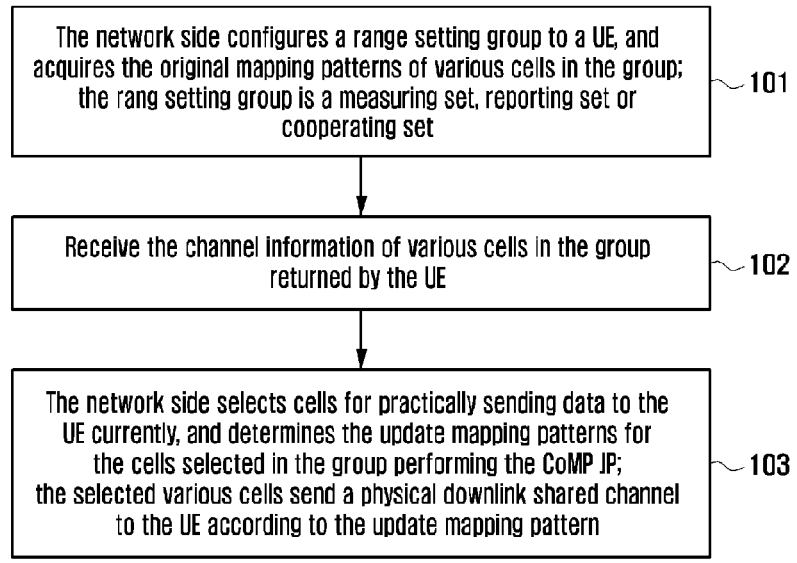
FIG. 1 is a flowchart of the method for implementing CoMP in accordance with embodiments of the present invention.

A method for implementing CoMP JP is provided in an embodiment of the present invention. The flowchart of the method as shown in FIG. 1 includes:

Step 101: the network side configures a range setting group to a UE, and acquires the original mapping patterns of various cells in the group; the range setting group is a measuring set, reporting set or cooperating set;

The method for the network side configuring a range setting group to a UE and acquiring the original mapping patterns of various cells in the group includes:

the network side delivering cell IDs of various cells included in the range setting group to the UE, and acquiring the original mapping patterns of various cells according to the preset corresponding relation between the Cell ID and the original mapping pattern of cell.

It should be noted that, for the network side and the UE, all original mapping patterns are preset definitely in the standards. In a practical application, these original mapping patterns correspond to various cells by a default corresponding relation, i.e. one cell corresponds to a determined original mapping pattern; the current used method in general is to establish a corresponding relation between the Cell ID of cell and the number of original mapping pattern; so that, for a determined cell, the number of original mapping pattern used by a cell may be computed according to the Cell ID of the cell. Similarly, after receiving the Cell ID of various cells in the range setting group delivered by the network side, the UE may acquire the original mapping pattern used by the cells by using the same algorithm as the network side. It is easily understood that, the forgoing method acquiring the original mapping pattern of a cell by the Cell ID of the cell is only an example compatible with the existing standards.

Step 102: receive the channel information of various cells in the group returned by the UE;

Step 103: the network side selects cells for practically sending data to the UE currently, and determines the update mapping patterns for the cells selected in the group performing the CoMP JP; the selected various cells send a physical downlink shared channel to the UE according to the update mapping pattern.

The method for the network side determining the mapping patterns for the selected various cells performing the CoMP JP is the core and key idea of the present invention, which is hereinafter described in detail with reference to embodiments.

Embodiment 1

According to the foregoing description, for a cell A, the mapping locations of CRS and CSI-RS in its original mapping pattern are not always the same as those in the original mapping pattern of its adjacent cell B; when the mapping locations are different, the RE corresponding to the mapping locations of CRS and CSI-RS in the original mapping pattern of cell B is identified in the original mapping pattern of cell A and the RE corresponding to the mapping locations of CRS and CSI-RS in the original mapping pattern of cell A is identified in the original mapping pattern of cell B, and the data are not transmitted by using the identified location during CoMP JP, so that, the other residual locations in the original mapping patterns of cell A and cell B may guarantee that cell A and cell B may select any RE to perform the CoMP JP without the problem that cell A and cell B are impossible to transmit data at the RE.

According to the above example, it is easily got that, the method for the network side determining the mapping patterns for the selected various cells performing the CoMP JP includes:

for any one of the cells selected from the group, identifying the RE corresponding to the mapping locations of CRS and CSI-RS in the original mapping pattern of all other cells of the group in the original mapping pattern of the cell, and acquiring the update mapping pattern used when the cell performs the CoMP JP by taking the identified RE as the time-frequency resource location that is not allowed to be used when the cell performs the CoMP JP.

It is easily understood that, the time-frequency resource locations, those can not be used in the CoMP JP, in the update mapping pattern of various cells of the group got by the method of embodiment 1 should identical.

Embodiment 2

Identifying the RE corresponding to the mapping locations of CRS and CSI-RS in the original mapping pattern of all cells of the group as the time-frequency resource locations those can not be used in the CoMP JP in embodiment 1 is designed in the case that various cells of the group are all used for sending data to a UE. In a practical application, however, various cells of the group allocated in step 101 are not all selected to send data to a UE during the CoMP JP; only a part of cells are used for sending data to the UE at the same time and the selected cells at one time may be different. In this case, the REs, those can not be used in the CoMP JP, identified in the case that various cells of the group are all used for sending data to a UE will obviously greatly be greater than or equal to the RE to be identified practically, so as to cause a certain extent waste of network resource.

To save the limited RE resource of mobile communication system, the present invention further provides a preferred embodiment; various cells oinf the group are classified in advance according to their original mapping patterns, the cells for practically sending data to a UE may be classified to one class or several classes during the CoMP JP; at this time, a first indication is set in the physical downlink control channel (PDCCH) sent by the network side to the serving cell, and the first indication is used for indicating which classes of cells are the cells for practically sending data to the UE; at the same time, the network side identifies the REs those can not be used for CoMP JP according to the practical used classes, and takes these REs as the time-frequency resource locations those are not allowed to be used during the CoMP JP, so that, it is possible to guarantee the normal application of CoMP JP.

Obviously, since the original mapping patterns are updated only according to the mapping locations of CRS and CSI-RS of the original mapping patterns of a part types of cells of the class, the number of REs, those can not be used for CoMP JP, identified by the method must be less than or equal to that got by the method of embodiment 1, so that embodiment 2 has a better resource utilization ratio than embodiment 1.

At this point, in step 103, between the step for the network side selecting the cells for practically sending data to a UE and the step for determining the update mapping patterns for use in the selected various cells performing the CoMP JP, the method further includes the following steps.

The network side set a first indication in the PDCCH delivered to the serving cell; the first indication is used for identifying the subgroup to which various cells for current sending data practically to a UE belong; the subgroup is a class preset in the system according to the original mapping patterns of various cells.

The above method is hereinafter described in detail with respect to examples.

A. in a LTE-A system, there may be six types of CRS mapping patterns at most; though the CSI-RS mapping pattern is not determined in the current standards, the number of the CSI-RS mapping patterns must be greater than six. Therefore, partitioning subgroup according to the original mapping pattern of CRS is a preferred method, and the cells of the group are partitioned into six subgroups according to the mapping pattern of CRS; the CRS mapping locations of various subgroups are identical while the CSI-RS mapping locations of various subgroups may be identical or different. During the CoMP JP, the network side sets a first indication of six bits in the delivered PDCCH according to the cells for practically sending data to a UE; the first indication is used for indicating that the cells for practically sending data to a UE belong to which subgroup or several subgroups of the six subgroups, and updating the original mapping patterns of these cells according to the subgroup to which the cells for practically sending data to a UE belong.

Therefore, the method for the network side setting a first indication in the PDCCH delivered to a serving cell includes the following steps.

The network side sets six subgroups according to the six types of CRS mapping patterns regulated in the system, sets a first indication of six bits of which each bit corresponds to a subgroup; for each bit, when there is a subgroup corresponding to the bit in the set composed of the cells for current sending data to a UE practically, the bit is set as valid state; otherwise, the bit is set as invalid state;

The first indication is added to the PDCCH delivered to the serving cell.

For example, supposing that there are four cells for current sending data practically to a UE (C1, C2, C3 and C4), which respectively belong to two subgroups of the six subgroups (supposing that the six subgroups are respectively SG1, SG2, SG3, SG4, SG5 and SG6) (supposing that C1 and C2 belong to SG2 while C3 and C4 belong to SG4), at this time, the UE is notified by a first indication in the delivered PDCCH that the cells for practically sending data to the UE belong to two subgroups of SG2 and SG4; at the same time, the network side updates the original mapping patterns of the four cells, which is explained by taking C1 for example.

Since the four cells, classified according to the CRS mapping pattern, respectively belong to two subgroups of SG2 and SG4 and the CRS mapping locations of the original mapping patterns of the two subgroups are different, for C1, it is necessary to identify the RE corresponding to the CRS mapping location of SG4 in its original mapping pattern, and then it is necessary to identify the RE corresponding to the CSI-RS mapping locations of C2, C3 and C4 in its original mapping pattern; the identified RE is used as the time-frequency resource location that is not allowed to be used for CoMP JP.

C2, C3 or C4 uses a mapping patter the same as the update mapping pattern of C1 to practically send data, which may guarantee the normal application of CoMP JP.

It is easily understood that, the above procedure is an example by taking C1 for example; in a practical application, each of all cells for practically use in CoMP JP updates its original mapping pattern to get its corresponding update mapping pattern.

B. alternatively, for an usual base station configuring two or four common antenna ports, the six CRS mapping patterns may further equal three effective mapping patterns, of which each mapping pattern includes two of the six CRS mapping patterns. Therefore, the cells of the group may be divided into three subgroups according to three effective CRS mapping pattern, and a first indication of three bits is set in the PDCCH to indicate the cells for practically sending data to a UE belong to which subgroup or which several subgroups.

It should be noted that, though the three effective CRS mapping patterns are equivalent to the six CRS mapping patterns according to the current frame structure, in practice, the method for portioning three subgroups may further be used in the case that various numbers of common antenna ports are configured in the base station of network side and the number of common antenna ports of various base stations in the network may be different; i.e. the number of common antenna ports of various base station of network side may be two or four; alternatively, the number of common antenna ports of various base station of network side are all one; or, the number of common antenna ports of various base station of network side are any one of one, two or four.

Therefore, the method for the network side setting a first indication in the PDCCH delivered to a serving cell includes the following steps.

The network side sets three subgroups according to the three effective CRS mapping patterns regulated in the system, sets a first indication of three bits of which each bit corresponds to a subgroup; for each bit, when there is a subgroup corresponding to the bit in the set composed of the cells for current sending data to a UE practically, the bit is set as valid state; otherwise, the bit is set as invalid state;

The first indication is added to the PDCCH delivered to the serving cell.

For example, a first indication of three bits, e.g. $b_0 b_1 b_2$ is set in the PDCCH, each bit corresponds to one of the three subgroups, which is as shown in following table 1:

TABLE 1

| $b_0, b_1, b_2$ of PDCCH | The RE that can not used for CoMP combined transmission |
|---|---|
| 0, 0, 0 | N/A |
| 0, 0, 1 | The RE corresponding to the CRS of the original mapping pattern of any cell of subgroup $b_2$ and the RE corresponding to the CSI-RS of the original mapping pattern of any cell of subgroup $b_2$ |
| 0, 1, 0 | The RE corresponding to the CRS of the original mapping pattern of any cell of subgroup $b_1$ and the RE corresponding to the CSI-RS of the original mapping pattern of any cell of subgroup $b_1$ |
| 1, 0, 0 | The RE corresponding to the CRS of the original mapping pattern of any cell of subgroup $b_0$ and the RE corresponding to the CSI-RS of the original mapping pattern of any cell of subgroup $b_0$ |
| 0, 1, 1 | The RE corresponding to the CRS of the original mapping pattern of any cell of subgroup $b_1$ and $b_2$ and the RE corresponding to the CSI-RS of the original mapping pattern of any cell of subgroup $b_1$ and $b_2$ |
| 1, 0, 1 | The RE corresponding to the CRS of the original mapping pattern of any cell of subgroup $b_0$ and $b_2$ and the RE corresponding to the CSI-RS of the original mapping pattern of any cell of subgroup $b_0$ and $b_2$ |

TABLE 1-continued

| $b_0, b_1, b_2$ of PDCCH | The RE that can not used for CoMP combined transmission |
|---|---|
| 1, 1, 0 | The RE corresponding to the CRS of the original mapping pattern of any cell of subgroup $b_0$ and $b_1$ and the RE corresponding to the CSI-RS of the original mapping pattern of any cell of subgroup $b_0$ and $b_1$ |
| 1, 1, 1 | The RE corresponding to the CRS of the original mapping pattern of any cell of subgroup $b_0$, $b_1$ and $b_2$ and the RE corresponding to the CSI-RS of the original mapping pattern of any cell of subgroup $b_0$, $b_1$ and $b_2$ |

When the $b_0 b_1 b_2$ is 001, it represents that the cells for current sending data practically to a UE belong to subgroup $b_2$; the network side identifies the RE corresponding to the CRS mapping location of the original mapping pattern of any cell of subgroup $b_2$, identifies the RE corresponding to the CSI-RS mapping location of the original mapping pattern of any cell of subgroup $b_2$, and takes the identified RE as the time-frequency location that is not allowed to used for CoMP JP;

When the $b_0 b_1 b_2$ is 101, it represents that the cells for current sending data practically to a UE belong to subgroup $b_0$ and $b_2$; the network side identifies the RE corresponding to the CRS mapping location of the original mapping pattern of any cell of subgroup $b_0$ and $b_2$, identifies the RE corresponding to the CSI-RS mapping location of the original mapping pattern of any cell of subgroup $b_0$ and $b_2$, and takes the identified RE as the time-frequency location that is not allowed to used for CoMP JP, In the case that $b_0 b_1 b_2$ is other value, which can be derived from the above examples and will not be herein described in detail any more.

C. or yet, in general, since a serving cell always sending data to a UE, when three bits are used to represent the subgroup to which the cells for practically sending data to a UE belong, the subgroup including the serving cell of the three effective subgroups will always be in the use state. To simplify the description, the subgroup to which the serving cell belongs is hereinafter referred to as subgroup $b_0$, which is not described one by one any more; therefore, preferably, the bit corresponding to the subgroup including the serving cell may be further omitted, i.e. a first indication of two bits is used to respectively represent the other two effective subgroups.

At this time, the method for the network side setting a first indication in the PDCCH delivered to a serving cell includes the following steps.

The network side sets three subgroups according to the three effective CRS mapping patterns regulated in the system, sets a first indication of two bits, of which each bit corresponds to one of the other two subgroups apart from the subgroup to which the serving cell belongs; for each bit, when there is a subgroup corresponding to the bit in the set composed of the cells for current sending data to a UE practically, the bit is set as valid state; otherwise, the bit is set as invalid state;

The first indication is added to the PDCCH delivered to the serving cell.

To simplify the description, the embodiment is hereinafter described with reference to an example.

For example, a first indication of two bits, e.g. $b_1 b_2$ is set in the PDCCH, and each bit corresponds to one of the other two subgroups apart from subgroup $b_0$, which is as shown in following table 2:

TABLE 2

| $b_1, b_2$ of PDCCH | The RE that can not used for CoMP combined transmission |
|---|---|
| 0, 0 | The RE corresponding to the CRS of the original mapping pattern of any cell of subgroup $b_0$ and the RE corresponding to the CSI-RS of the original mapping pattern of any cell of subgroup $b_0$ |
| 0, 1 | The RE corresponding to the CRS of the original mapping pattern of any cell of subgroup $b_0$ and $b_2$ and the RE corresponding to the CSI-RS of the original mapping pattern of any cell of subgroup $b_0$ and $b_2$ |
| 1, 0 | The RE corresponding to the CRS of the original mapping pattern of any cell of subgroup $b_0$ and $b_1$ and the RE corresponding to the CSI-RS of the original mapping pattern of any cell of subgroup $b_0$ and $b_1$ |
| 1, 1 | The RE corresponding to the CRS of the original mapping pattern of any cell of subgroup $b_0$, $b_1$ and $b_2$ and the RE corresponding to the CSI-RS of the original mapping pattern of any cell of subgroup $b_0$, $b_1$ and $b_2$ |

Since the subgroup including a serving cell is always used for sending data to a UE, therefore, when the $b_1b_2$ is 01, it represents that the cells for current sending data practically to a UE belong to subgroup $b_0$ (i.e. the subgroup including the serving cell) and $b_2$; at this time, the network side identifies the RE corresponding to the CRS mapping location of the original mapping pattern of any cell of subgroup $b_0$ and $b_2$, identifies the RE corresponding to the CSI-RS mapping location of the original mapping pattern of any cell of subgroup $b_0$ and $b_2$, and takes the identified RE as the time-frequency location that is not allowed to used for CoMP JP. It is obvious that, the update mapping pattern is completely the same as that when the $b_0b_1b_2$ is 101 in the foregoing description.

In the case that $b_1b_2$ is other value, which can be derived from the above examples and will not be herein described in detail any more.

D. or again, a first indication of one bit may be used to perform resource optimization configuration for some special mapping patterns of CoMP JP as required, for example, d1, a first indication of one bit is set in the PDCCH; when the first indication is valid, it represents that the cells for current sending data practically to a UE and the serving cell belong to the same subgroup $b_0$; at this time, the network side identifies the RE corresponding to the CRS mapping location of the original mapping pattern of any cell of subgroup $b_0$, identifies the RE corresponding to the CSI-RS mapping location of the original mapping pattern of any cell of subgroup $b_0$, and takes the identified RE as the time-frequency location that is not allowed to used for CoMP JP;

when the first indication is invalid, it represents that the cells for current sending data practically to a UE are not all belong to the same subgroup as the serving cell; at this time, according to the method of embodiment 1, the network side identifies the RE corresponding to the CRS mapping location of the original mapping pattern of any cell of the group, identifies the RE corresponding to the CSI-RS mapping location of the original mapping pattern of any cell of the group, and takes the identified RE as the time-frequency location that is not allowed to used for CoMP JP.

Therefore, the method for the network side setting a first indication in the PDCCH delivered to a serving cell includes the following steps.

The network side sets six subgroups according to the six types of CRS mapping patterns regulated in the system, or sets three subgroups according to the three effective CRS mapping patterns regulated in the system, sets a first indication of one bit; when the cells for current sending data practically to a UE and the serving cell belong to the same subgroup, the bit is set as valid state; otherwise, the bit is set as invalid state;

The first indication is added to the PDCCH delivered to the serving cell.

d2, or, a first indication of one bit is set in the PDCCH; when the first indication is valid, it represents that the cells for current sending data practically to a UE are the set of all cells having the same original mapping pattern as the serving cell, which is hereinafter referred to as subgroup bsc; at this time, the network side identifies the RE corresponding to the CRS mapping location of the original mapping pattern of any cell of subgroup bsc, identifies the RE corresponding to the CSI-RS mapping location of the original mapping pattern of any cell of subgroup bsc, and takes the identified RE as the time-frequency location that is not allowed to used for CoMP JP;

when the first indication is invalid, it represents that the original mapping patterns of the cells for current sending data practically to a UE are not all the same as that of the serving cell; at this time, according to the method of embodiment 1, the network side identifies the RE corresponding to the CRS mapping location of the original mapping pattern of any cell of the group, identifies the RE corresponding to the CSI-RS mapping location of the original mapping pattern of any cell of the group, and takes the identified RE as the time-frequency location that is not allowed to used for CoMP JP.

At this time, the method for the network side setting a first indication in the PDCCH delivered to a serving cell includes the following steps.

The network side sets six subgroups according to the six types of CRS mapping patterns regulated in the system, or sets three subgroups according to the three effective CRS mapping patterns regulated in the system, sets a first indication of one bit; when the cells for current sending data practically to a UE only include the serving cell, the bit is set as valid state; otherwise, the bit is set as invalid state;

The first indication is added to the PDCCH delivered to the serving cell.

Comparing embodiment 1 and 2, it is obviously that, the method for further grouping the cells for practically sending data to a UE of embodiment 2 has more reasonable resource configuration effect than the method of embodiment 1. Further, comparing A~D of embodiment 2, it is obvious that, the more the bit of the first indication used in the PDCCH is, the finer grouping the cells for practically sending data to a UE is, and the more reasonable the resource configuration of the cells for practically sending data to the UE during CoMP JP is; the less the bit of the first indication used in the PDCCH is, the coarser grouping the cells for practically sending data to a UE is, and the more unreasonable the resource configuration of the cells for practically sending data to the UE during CoMP JP is, so that it is possible to waste a certain extent RE resource.

It is obvious that, the more the bit of the first indication used in the PDCCH is, the more reasonable the RE resource configuration of the cells for practically sending data to the UE during CoMP JP is. Therefore, in a practical application, those skilled in the art may perform the adequate selection according to the resource state of network and the reasonable requirements of resource configuration; the modes of practical configuration are impossible to be enumerated one by one limited in the length of the specification. It should be noted that, in the description of the above embodiments, no matter dividing the cells for practically sending data to a UE into six subgroups or three subgroups, or indicating the subgroup by using how many bits, which are only examples; the other various embodiments reasonably deduced by those skilled in the art by understanding the principle of the present invention should be included in the scheme disclosed by the present invention.

Further, during the CoMP JP, the physical control format indication channels (PCFICH) of the cells for practically sending data to a UE are all set dynamically, so that the start OFDM symbol bit for transmitting data in the PDSCHs of various cells may be not completely identical. For example, in the PDSCHs of two adjacent cells, the start OFDM symbol bit for transmitting data in cell A is start from the third OFDM symbol bit of subframe while the start OFDM symbol bit for transmitting data in cell B is start from the second OFDM symbol bit of subframe; in this case, the start OFDM symbol bit for transmitting data in cell B must be the same as that in cell A to guarantee the same data are sent at the same time-frequency resource location when cell A and B perform the CoMP JP; so that, the second OFDM symbol bit in cell B must be in an unused state, which causes a greatly waste of network resource. It has been indicated in the foregoing description that, in a practical CoMP JP application, the cells for practically sending data to a UE in the group are not always all cells of the group; sometimes the cells for practically sending data to a UE in the group may be one cell; at this time, the single cell sending data to the UE is a serving cell of the UE. Obviously, it is necessary to guarantee that the start OFDM symbol bits for practically transmitting data of various cells are identical when various cells send data to a UE at the same time; when only the serving cell sends data to the UE, the data may be sent according to the original mapping pattern composed of the PCFICH, CRS and CSI-RS of the serving cell though there is no the problem that the original mapping patterns of various cells are different.

To determine whether the cells for practically sending data to a UE are only the serving cell so as to avoid the meaningless waste of network resource, when the network side sets a first indication in the physical downlink control channel (PDCCH) delivered to the serving cell, the embodiment of the present invention further includes the following steps.

The network side sets a second indication in the PDCCH delivered to a serving cell; the second indication is used for identifying whether the cells for practically sending data to a UE are only the serving cell.

Correspondingly, if the cells for current sending data practically to the UE are only the serving cell, the update mapping pattern of the serving cell is its original mapping pattern; afterwards, the serving cell may send data to the UE according to the original mapping pattern.

If the cells for current sending data practically to the UE are not only the serving cell, there are two cases correspondingly according to the difference between embodiment 1 and 2 in the foregoing description.

1) the update mapping patterns for various cells performing the CoMP JP are determined according to the method provided by embodiment 1 and the CoMP JP is performed.

2) alternatively, preferably, in step 103, between the step for the network side selecting the cells for practically sending data to a UE and the step for determining the update mapping patterns for use in the selected various cells performing the CoMP JP, the method further includes the following steps.

The network side sets a first indication and a second indication in the PDCCH delivered to the serving cell; the first indication is used for identifying the subgroup to which various cells for current sending data practically to a UE belong; the subgroup is a class preset in the system according to the original mapping patterns of various cells; the second indication is used for identifying whether the cells for practically sending data to a UE are only the serving cell.

At this time, if the cells for current sending data practically to the UE are not only the serving cell, the update mapping patterns for various cells performing the CoMP JP may be determined according to various methods provided by embodiment 2 and the CoMP JP is performed.

It is easily understood that, in case 2, preferably, the first indication and the second indication may further be combined as one indication, which is hereinafter referred to as associated indication to avoid confusion. The method for combining the first indication and the second indication belongs to the common technical means of those skills in the art, which is not limited in embodiments of the present invention; the spirit of the present invention is hereinafter described in detail by taking several implementing examples in embodiment 2 for example.

1. The network side sets three subgroups according to the three effective CRS mapping patterns regulated in the system, sets an associated indication of three bits; when the cells for current sending data practically to a UE only include the serving cell, each bit is set as invalid state; otherwise, sets that each bit corresponds to one subgroup; for each bit, when there is a subgroup corresponding to the bit in the set composed of the cells for current sending data to a UE practically, the bit is set as valid state; otherwise, the bit is set as invalid state.

By taking the indication of three bits used by table 1 for example, at this time, the indication of three bits is used as the associated indication, and correspondingly table 1 is modified as table 3.

TABLE 3

| $b_0, b_1, b_2$ of PDCCH | The RE that can not used for CoMP combined transmission |
|---|---|
| 0, 0, 0 | the cells for current sending data practically to the UE are only the serving cell, and the data are sent according to the original mapping pattern composed of PCFICH, CRS and CSI-RS of the serving cell |
| 0, 0, 1 | The RE corresponding to the CRS of the original mapping pattern of any cell of subgroup $b_2$ and the RE corresponding to the CSI-RS of the original mapping pattern of any cell of subgroup $b_2$ |
| 0, 1, 0 | The RE corresponding to the CRS of the original mapping pattern of any cell of subgroup $b_1$ and the RE corresponding to the CSI-RS of the original mapping pattern of any cell of subgroup $b_1$ |
| 1, 0, 0 | The RE corresponding to the CRS of the original mapping pattern of any cell of subgroup $b_0$ and the RE corresponding to the CSI-RS of the original mapping pattern of any cell of subgroup $b_0$ |
| 0, 1, 1 | The RE corresponding to the CRS of the original mapping pattern of any cell of subgroup $b_1$ and $b_2$ and the RE corresponding to the CSI-RS of the original mapping pattern of any cell of subgroup $b_1$ and $b_2$ |
| 1, 0, 1 | The RE corresponding to the CRS of the original mapping pattern of any cell of subgroup $b_0$ and $b_2$ and the RE corresponding to the CSI-RS of the original mapping pattern of any cell of subgroup $b_0$ and $b_2$ |
| 1, 1, 0 | The RE corresponding to the CRS of the original mapping pattern of any cell of subgroup $b_0$ and $b_1$ and the RE corresponding to the CSI-RS of the original mapping pattern of any cell of subgroup $b_0$ and $b_1$ |

TABLE 3-continued

| $b_0$, $b_1$, $b_2$ of PDCCH | The RE that can not used for CoMP combined transmission |
|---|---|
| 1, 1, 1 | The RE corresponding to the CRS of the original mapping pattern of any cell of subgroup $b_0$, $b_1$ and $b_2$ and the RE corresponding to the CSI-RS of the original mapping pattern of any cell of subgroup $b_0$, $b_1$ and $b_2$ | it is obvious by comparing table 1 with table 3 that, the $b_0 b_1 b_2$ is 000, it presents the cells for current sending data practically to the UE are only the serving cell in table 3; the other settings in table 3 are the same as those in table 1. In accordance with this method, it is possible to avoid specially keeping one bit for the second indication; the saved bit is combined to the coding rule of the first indication, so that it is possible to save the bit overhead of PDCCH.

2. The network side sets three subgroups according to the three effective CRS mapping patterns regulated in the system, sets an associated indication of two bits; when the cells for current sending data practically to a UE only include the serving cell, each bit is set as invalid state; otherwise, sets that each bit corresponds to one of the other two subgroups apart from the subgroup to which the serving cell belongs; for each bit, when there is a subgroup corresponding to the bit in the set composed of the cells for current sending data to a UE practically, the bit is set as valid state; otherwise, the bit is set as invalid state.

By taking the indication of two bits used by table 2 for example, at this time, the indication of two bits is used as the associated indication, and correspondingly table 2 is modified as table 4.

TABLE 4

| $b_1$, $b_2$ of PDCCH | The RE that can not used for CoMP combined transmission |
|---|---|
| 0, 0 | If the subgroup including the serving cell are only the serving cell, the data are sent according to the original mapping pattern composed of PCFICH, CRS and CSI-RS of the serving cell; Otherwise, the RE corresponding to the CRS mapping location of the original mapping pattern of any cell of subgroup $b_0$ is identified, and the RE corresponding to the CSI-RS mapping location of the original mapping pattern of any cell of subgroup $b_0$ is identified; the identified RE is used as the time-frequency location that is not allowed to used for CoMP JP. |
| 0, 1 | The RE corresponding to the CRS of the original mapping pattern of any cell of subgroup $b_0$ and $b_2$ and the RE corresponding to the CSI-RS of the original mapping pattern of any cell of subgroup $b_0$ and $b_2$ |
| 1, 0 | The RE corresponding to the CRS of the original mapping pattern of any cell of subgroup $b_0$ and $b_1$ and the RE corresponding to the CSI-RS of the original mapping pattern of any cell of subgroup $b_0$ and $b_1$ |
| 1, 1 | The RE corresponding to the CRS of the original mapping pattern of any cell of subgroup $b_0$, $b_1$ and $b_2$ and the RE corresponding to the CSI-RS of the original mapping pattern of any cell of subgroup $b_0$, $b_1$ and $b_2$ |

It is obvious by comparing table 2 with table 4 that, the $b_1 b_2$ is 00, it presents two possible cases in table 4: one is the cells for current sending data practically to the UE are only the serving cell and the serving cell belongs to subgroup $b_0$; the other one is the cells for current sending data practically to the UE all belong to subgroup $b_0$ and the subgroup $b_0$ does not only include the serving cell. Obviously, for the former case, the original mapping pattern of the serving cell is its practically-used update mapping patter; for the later case, the RE corresponding to the CRS mapping location of the original mapping pattern of any cell of subgroup $b_0$ is identified, and the RE corresponding to the CSI-RS mapping location of the original mapping pattern of any cell of subgroup $b_0$ is identified; the identified RE is used as the time-frequency location that is not allowed to used for CoMP JP. In the case that $b_1 b_2$ are other values, the settings in table 4 are the same as those in table 2, which is not described in detail any more.

3. by taking the indication of one bit used in d1 and d2 of D of embodiment 2, at this time, the indication of single bit is used as the associated indication. The description is hereinafter given respectively corresponding to d1 and d2.

d1'. The indication of single bit adapted in d1 is used as the associated indication.

At this time, the network side sets six subgroups according to the six types of CRS mapping patterns regulated in the system, or sets three subgroups according to the three effective CRS mapping patterns regulated in the system, sets an associated indication of one bit; when the cells for current sending data practically to a UE only include the serving cell, the bit is set as invalid state; otherwise, when the cells for current sending data practically to a UE and the serving cell belong to the same subgroup, the bit is set as valid state; otherwise, the bit is set as invalid state.

therefore, when the associated indication is valid, it presents two possible cases: one is the cells for current sending data practically to the UE are only the serving cell and the serving cell belongs to subgroup $b_0$; the other one is the cells for current sending data practically to the UE all belong to subgroup $b_0$ and the subgroup $b_0$ does not only include the serving cell. Obviously, for the former case, the network side continues to send data by taking the original mapping pattern of the serving cell as its practically-used update mapping pattern; for the later case, the RE corresponding to the CRS mapping location of the original mapping pattern of any cell of subgroup $b_0$ is identified, and the RE corresponding to the CSI-RS mapping location of the original mapping pattern of any cell of subgroup $b_0$ is identified; the identified RE is used as the time-frequency location that is not allowed to used for CoMP JP.

when the associated indication is invalid, it represents that the cells for current sending data practically to a UE are not all belong to the same subgroup as the serving cell; at this time, according to the method of embodiment 1, the network side identifies the RE corresponding to the CRS mapping location of the original mapping pattern of any cell of the group, identifies the RE corresponding to the CSI-RS mapping location of the original mapping pattern of any cell of the group, and takes the identified RE as the time-frequency location that is not allowed to used for CoMP JP.

d2'. The indication of single bit adapted in d2 is used as the associated indication.

At this time, the network side sets six subgroups according to the six types of CRS mapping patterns regulated in the system, or sets three subgroups according to the three effective CRS mapping patterns regulated in the system, sets an associated indication of one bit; when the cells for current sending data practically to a UE only include the serving cell, the bit is set as valid state; otherwise, the bit is set as invalid state.

Therefore, when the associated indication is valid, it represents that the cells for current sending data practically to a UE only are the serving cell; when the associated indication is invalid, it represents that the cells for current sending data practically to a UE does not only include the serving cell.

Obviously, for the former case, the network side continues to send data by taking the original mapping pattern of the serving cell as its practically-used update mapping pattern; for the later case, according to the method of embodiment 1, the network side identifies the RE corresponding to the CRS mapping location of the original mapping pattern of any cell of the group, identifies the RE corresponding to the CSI-RS mapping location of the original mapping pattern of any cell of the group, and takes the identified RE as the time-frequency location that is not allowed to used for CoMP JP.

It can be seen from the foregoing description that, in the method for implementing CoMP JP in accordance with embodiments of the present invention, the mapping patterns of the cells for practically sending data to a UE are updated by acquiring the CRS and CSI-RS mapping locations of the original mapping pattern of cells of the range setting group to get the update mapping pattern for use in the CoMP JP, so that it is possible to make the CRS and CSI-RS mapping locations of the cells for practically sending data to a UE are different and guarantee that various cells are able to perform the CoMP JP at the same RE location, thereby meeting the design principle of CRS and CSI-RS and the normal application of CoMP JP at the same time. In addition, for the CSI-RS, since it is possible to guarantee the time-frequency resource locations for various cells sending CSI-RS are different, so as to guarantee the interference is small when the signal is sent; since the signal is used for channel measurement after being received by a UE, it is possible to improve the precision for the UE measuring a cell having weak signals in accordance with embodiments of the present invention.

Figure 2:
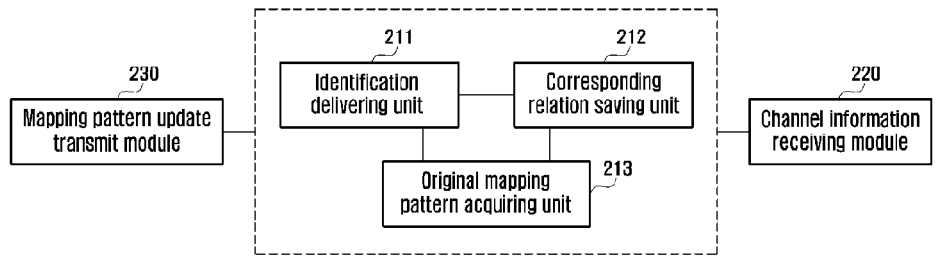
FIG. 2 is a structure schematic diagram of the apparatus for implementing CoMP in accordance with embodiment of the present invention.

Based on the above method, an apparatus for implementing CoMP JP is further provided in accordance with embodiments of the present invention; the structure of the apparatus is as shown in FIG. 2; the apparatus includes: an original setting module 210, channel information receiving module 220 and mapping pattern update transmit module 230;

original setting module 210 is used for configuring a range setting group to a user equipment (UE), and acquiring the original mapping patterns of various cells in the group; the rang setting group is a measuring set, reporting set or cooperating set;

channel information receiving module 220 is used for receiving the channel information of various cells in the group returned by the UE;

mapping pattern update transmit module 230 is used for selecting cells for practically sending data to the UE currently, determining the update mapping patterns for the cells selected from the group performing the CoMP JP, and controlling the selected various cells to send a physical downlink shared channel to the UE according to the update mapping pattern.

The original setting module 210 further includes:

identification delivering unit 211 for delivering the cell identifications of various cells included by the range setting group to the UE; the rang setting group is a measuring set, reporting set or cooperating set;

corresponding relation saving unit 212 for saving the preset corresponding relation between the cell identification and the original mapping pattern of cell, and providing the corresponding relation to original mapping pattern acquiring unit 213;

original mapping pattern acquiring unit 213 for acquiring the original mapping patterns of various cells according to the corresponding relations saved in corresponding relation saving unit 212.

Corresponding to the method for implementing CoMP JP in accordance with embodiments of the present invention, in the apparatus, there are many embodiments of the mapping pattern update transmit module, which will be hereinafter described respectively by taking several embodiments for example.

Embodiment 1

Figure 3:
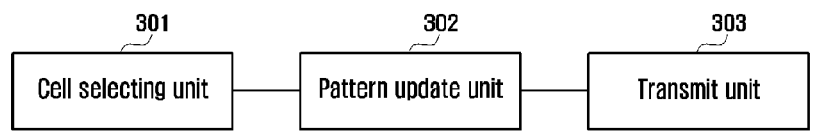
FIG. 3 is a first structure schematic diagram of the mapping pattern update transmit module in accordance with embodiments of the present invention.

At this time, the structure schematic diagram of mapping pattern update transmit module 230 is as shown in FIG. 3; the mapping pattern update transmit module 230 includes: a cell selecting unit 301, pattern update unit 302 and transmit unit 303;

cell selecting unit 301 is used for selecting the cells for current sending data to a UE practically from the range setting group;

pattern update unit 302 is used for, for any one of various cells selected from the group, identifying the RE corresponding to the mapping locations of CRS and CSI-RS in the original mapping pattern of all cells of the group in the original mapping pattern of the cell, and acquiring the update mapping pattern used when the cell performs the CoMP JP by taking the identified RE as the time-frequency resource location that is not allowed to be used when the cell performs the CoMP JP;

transmit unit 303 is used for controlling the selected various cells to send a physical downlink shared channel to the UE according to the update mapping pattern.

Embodiment 2

Figure 4:
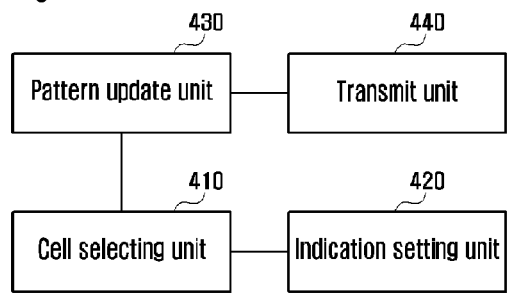
FIG. 4 is a second structure schematic diagram of the mapping pattern update transmit module in accordance with embodiments of the present invention.

At this time, the structure schematic diagram of mapping pattern update transmit module 230 is as shown in FIG. 4; the mapping pattern update transmit module 230 includes: a cell selecting unit 410, indication setting unit 420, pattern update unit 430 and transmit unit 440;

cell selecting unit 410 is used for selecting the cells for current sending data to a UE practically from the range setting group;

indication setting unit 420 is used for setting an indication of one bit in the PDCCH delivered to a serving cell; when the cells for current sending data to a UE practically only includes the serving cell, the bit is set as valid state; otherwise, the bit is set as invalid state;

pattern update unit 430 is used for determining whether the cells for current sending data to a UE practically only include a serving cell; if the cells for current sending data to a UE practically only include the serving cell, the original mapping pattern of the serving cell is used as the update mapping pattern used when the serving cell performs the CoMP JP; otherwise, identifying the RE corresponding to the mapping locations of CRS and CSI-RS in the original mapping pattern of all cells of the group in the original mapping pattern of any one of the cells selected from the group, and acquiring the update mapping pattern used when the cell performs the CoMP JP by taking the identified RE as the time-frequency resource location that is not allowed to be used when the cell performs the CoMP JP;

transmit unit 440 is used for controlling the selected various cells to send a physical downlink shared channel to the UE according to the update mapping pattern.

Embodiment 3

Figure 5:
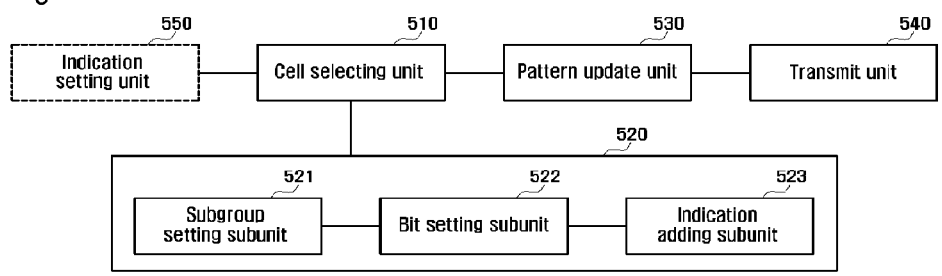
FIG. 5 is a third structure schematic diagram of the mapping pattern update transmit module in accordance with embodiments of the present invention.

At this time, the structure schematic diagram of mapping pattern update transmit module 230 is as shown in FIG. 5;

the mapping pattern update transmit module 230 includes: a cell selecting unit 510, first indication setting unit 520, pattern update unit 530 and transmit unit 540;

cell selecting unit 510 is used for selecting the cells for current sending data to a UE practically from the range setting group;

first indication setting unit 520 is used for setting a first indication in the PDCCH delivered to a serving cell; the first indication is used for identifying the subgroup to which various cells for current sending data practically to a UE belong; the subgroup is a class classified according to the CRS mapping patterns regulated by the system;

pattern update unit 530 is used for, for any one of various cells selected from the group, identifying the resource element (RE) corresponding to the CRS mapping locations included by every other existing subgroup in the original mapping pattern of the cell, identifying the RE corresponding to the CSI-RS mapping locations included by all existing subgroups in the original mapping pattern of the cell, and acquiring the update mapping pattern used when the cell performs the CoMP JP by taking the identified RE as the time-frequency resource location that is not allowed to be used when the cell performs the CoMP JP;

transmit unit 540 is used for controlling the selected various cells to send a physical downlink shared channel to the UE according to the update mapping pattern.

The first indication setting unit 520 includes:

subgroup setting subunit 521 for setting six subgroups according to the six types of CRS mapping patterns regulated in the system, and setting a first indication of six bits, of which each bit corresponds to one subgroup;

bit setting subunit 522, for each bit set by the subgroup setting subunit 521, setting the bit as valid state when there is a subgroup corresponding to the bit in the set composed of the cells for current sending data to a UE practically; otherwise, setting the bit as invalid state;

indication adding subunit 523 for adding the first indication to the PDCCH delivered to the serving cell.

or, preferably, subgroup setting subunit 521 for setting three subgroups according to the three effective CRS mapping patterns regulated in the system, and setting a first indication of three bits, of which each bit corresponds to one subgroup;

bit setting subunit 522, for each bit set by the subgroup setting subunit 521, setting the bit as valid state when there is a subgroup corresponding to the bit in the set composed of the cells for current sending data to a UE practically; otherwise, setting the bit as invalid state;

indication adding subunit 523 for adding the first indication to the PDCCH delivered to the serving cell.

or, preferably, subgroup setting subunit 521 for setting three subgroups according to the three effective CRS mapping patterns regulated in the system, and setting a first indication of two bits, of which each bit corresponds to one of the other two subgroups apart from the subgroup to which the serving cell belongs;

bit setting subunit 522, for each bit set by the subgroup setting subunit 521, setting the bit as valid state when there is a subgroup corresponding to the bit in the set composed of the cells for current sending data to a UE practically; otherwise, setting the bit as invalid state;

indication adding subunit 523 for adding the first indication to the PDCCH delivered to the serving cell.

or again, preferably, subgroup setting subunit 521 for setting six subgroups according to the six types of CRS mapping patterns regulated in the system, or setting three subgroups according to the three effective CRS mapping patterns regulated in the system, and setting a first indication of one bit;

bit setting subunit 522 for setting the bit as valid state when the cells for current sending data practically to a UE and the serving cell belong to the same subgroup;

otherwise, setting the bit as invalid state;

indication adding subunit 523 for adding the first indication to the PDCCH delivered to the serving cell.

or yet, preferably, subgroup setting subunit 521 for setting six subgroups according to the six types of CRS mapping patterns regulated in the system, or setting three subgroups according to the three effective CRS mapping patterns regulated in the system, and setting a first indication of one bit;

bit setting subunit 522 for setting the bit as valid state when the cells for current sending data to a UE practically only include the serving cell; otherwise, setting the bit as invalid state;

indication adding subunit 523 for adding the first indication to the PDCCH delivered to the serving cell.

In addition, preferably, the mapping pattern update transmit module 230 may further includes:

second indication setting unit 550 (as shown by the dotted line frame in FIG. 5) for setting a second indication of one bit in the PDCCH delivered to a serving cell; the second indication is used for identifying whether the cells for current sending data practically to a UE only are the serving cell.

At this time, the pattern update unit 530 is further used for determining whether the cells for current sending data to a UE practically only include a serving cell; if the cells for current sending data to a UE practically only include the serving cell, the original mapping pattern of the serving cell is used as the update mapping pattern used when the serving cell performs the CoMP JP; otherwise, for any one of the cells selected from the group, identifying the resource element (RE) corresponding to the CRS mapping locations included by every other existing subgroup in the original mapping pattern of the cell, identifying the RE corresponding to the CSI-RS mapping locations included by all existing subgroups in the original mapping pattern of the cell, and acquiring the update mapping pattern used when the cell performs the CoMP JP by taking the identified RE as the time-frequency resource location that is not allowed to be used when the cell performs the CoMP JP.

Embodiment 4

Figure 6:
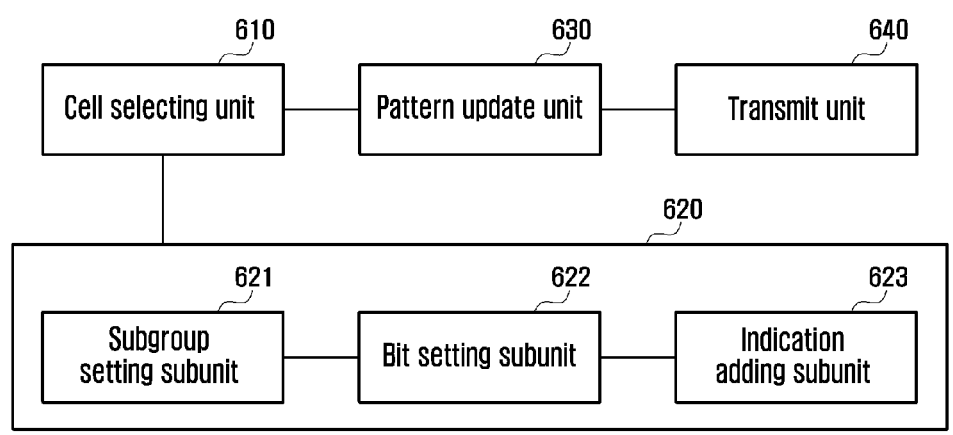
FIG. 6 is a forth structure schematic diagram of the mapping pattern update transmit module in accordance with embodiments of the present invention.

At this time, the structure schematic diagram of mapping pattern update transmit module 230 is as shown in FIG. 6; the mapping pattern update transmit module 230 includes: a cell selecting unit 610, associated indication setting unit 620, pattern update unit 630 and transmit unit 640;

cell selecting unit 610 is used for selecting the cells for current sending data to a UE practically from the range setting group;

associated indication setting unit 620 is used for setting an associated indication in the PDCCH delivered to the serving cell; the associated indication is used for identifying the subgroup to which various cells for current sending data practically to a UE belong and identifying whether the cells for practically sending data to a UE are only the serving cell; the subgroup is a class preset in the system according to the original mapping patterns of various cells;

pattern update unit 630 is used for determining whether the cells for current sending data to a UE practically only include a serving cell; if the cells for current sending data to a UE practically only include the serving cell, the original mapping pattern of the serving cell is used as the update mapping pattern used when the serving cell performs the CoMP JP; otherwise, for any one of the cells selected from the group, identifying the resource element (RE) corresponding to the CRS mapping locations included by every other existing subgroup in the original mapping pattern of the cell, identifying the RE corresponding to the CSI-RS mapping locations included by all existing subgroups in the original mapping pattern of the cell, and acquiring the update mapping pattern used when the cell performs the CoMP JP by taking the identified RE as the time-frequency resource location that is not allowed to be used when the cell performs the CoMP JP.

transmit unit 640 is used for controlling the selected various cells to send a physical downlink shared channel to the UE according to the update mapping pattern.

The associated indication setting unit 620 includes:

subgroup setting subunit 621 for setting six subgroups according to the six types of CRS mapping patterns regulated in the system, and setting a first indication of six bits, of which each bit corresponds to one subgroup;

bit setting subunit 622 for setting each bit as invalid state when the cells for current sending data practically to a UE only include the serving cell; otherwise, for each bit, setting the bit as valid state when there is a subgroup corresponding to the bit in the set composed of the cells for current sending data to a UE practically; otherwise, setting the bit as invalid state;

indication adding subunit 623 for adding the associated indication to the PDCCH delivered to the serving cell.

or, preferably, subgroup setting subunit 621 for setting three subgroups according to the three effective CRS mapping patterns regulated in the system, and setting an associated indication of three bits, of which each bit corresponds to one subgroup;

bit setting subunit 622 for setting each bit as invalid state when the cells for current sending data practically to a UE only include the serving cell; otherwise, for each bit, setting the bit as valid state when there is a subgroup corresponding to the bit in the set composed of the cells for current sending data to a UE practically; otherwise, setting the bit as invalid state;

indication adding subunit 623 for adding the associated indication to the PDCCH delivered to the serving cell.

or, preferably, subgroup setting subunit 621 for setting three subgroups according to the three effective CRS mapping patterns regulated in the system, and setting an associated indication of two bits, of which each bit corresponds to one of the other two subgroups apart from the subgroup to which the serving cell belongs;

bit setting subunit 622 for setting each bit as invalid state when the cells for current sending data practically to a UE only include the serving cell; otherwise, for each bit, setting the bit as valid state when there is a subgroup corresponding to the bit in the set composed of the cells for current sending data to a UE practically; otherwise, setting the bit as invalid state;

indication adding subunit 623 for adding the associated indication to the PDCCH delivered to the serving cell.

or again, preferably, subgroup setting subunit 621 for setting six subgroups according to the six types of CRS mapping patterns regulated in the system, or setting three subgroups according to the three effective CRS mapping patterns regulated in the system, and setting an associated indication of one bit;

bit setting subunit 622 for setting the bit as invalid state when the cells for current sending data practically to a UE only include the serving cell; otherwise, setting the bit as valid state when the cells for current sending data practically to a UE and the serving cell belong to the same subgroup; otherwise, setting the bit as invalid state;

indication adding subunit 623 for adding the associated indication to the PDCCH delivered to the serving cell.

or yet, preferably, subgroup setting subunit 621 for setting six subgroups according to the six types of CRS mapping patterns regulated in the system, or setting three subgroups according to the three effective CRS mapping patterns regulated in the system, and setting an associated indication of one bit;

bit setting subunit 622 for setting the bit as valid state when the cells for current sending data to a UE practically only include the serving cell; otherwise, setting the bit as invalid state;

indication adding subunit 623 for adding the associated indication to the PDCCH delivered to the serving cell.

It can be seen from the foregoing description that, in the apparatus for implementing CoMP JP in accordance with embodiments of the present invention, the mapping patterns of the cells for practically sending data to a UE are updated by acquiring the CRS and CSI-RS mapping locations of the original mapping pattern of cells of the range setting group to get the update mapping pattern for use in the CoMP JP, so that it is possible to make the CRS and CSI-RS mapping locations of the cells for practically sending data to a UE are different and guarantee that various cells are able to perform the CoMP JP at the same RE location, thereby meeting the design principle of CRS and CSI-RS and the normal application of CoMP JP. In addition, for the CSI-RS, since it is possible to guarantee the time-frequency resource locations for various cells sending CSI-RS are different, so as to guarantee the interference is small when the signal is sent; since the signal is used for channel measurement after being received by a UE, it is possible to improve the precision for the UE measuring a cell having weak signals in accordance with embodiments of the present invention.

INDUSTRIAL APPLICABILITY

At last, it is should be noted that, the foregoing description is only preferred embodiments of the present invention and is not for use in limiting the spirit and protection scope thereof. All the modifications, equivalent replacements and improvements without departing from the spirit and principles of the present invention should be included in the protection scope of the present invention.

The invention claimed is:

1. A method for implementing a coordinated multiple point transmission (CoMP), comprising:
configuring, by a network side, a range setting group to a user equipment (UE);
acquiring original mapping patterns of a reference signal (RS) corresponding to a plurality of cells in the range setting group based on identification (ID) of the plurality of cells;
receiving channel information of the plurality of cells in the range setting group transmitted by the UE;
selecting, by the network side, cells for transmitting data to the UE currently;

determining update mapping patterns for the selected cells based on the acquired original mapping patterns of the RS; and transmitting the data on a physical downlink shared channel (PDSCH) to the UE based on the determined update mapping patterns for the selected cells, wherein the update mapping patterns for the selected cells are identical to each other, wherein the update mapping patterns is determined to comprise at least one resource element (RE) corresponding to mapping locations of a cell-specific reference signal (CRS) and a channel state information reference signal (CSI-RS) in the original mapping patterns, and the at least one RE is not used for transmitting data, and wherein after the selecting of the cells for transmitting the data to the UE and before the determination of the update mapping patterns, the method further comprises:

setting, by the network side, an indication in a physical downlink control channel (PDCCH) delivered to a serving cell, the indication associated with whether the cells for transmitting data to the UE comprise only the serving cell or not.

2. The method of claim 1, wherein the configuring of the range setting group to the UE and the acquiring of the original mapping patterns of the plurality of cells in the range setting group comprises:

delivering, by the network side, cell identifications of the plurality of cells included in the range setting group to the UE, and acquiring the original mapping patterns of the plurality of cells according to a preset corresponding relation between the cell identification and the original mapping patterns of the plurality of cells.

3. The method of claim 2, wherein the determination of the update mapping patterns for the cells selected from the range setting group performing the CoMP comprises:

for any one of the cells selected from the range setting group, identifying the resource element (RE) corresponding to mapping locations of the cell-specific reference signal (CRS) and the channel state information reference signal (CSI-RS) in the original mapping patterns of the RS for the one cell; and acquiring an update mapping pattern for the RS by taking the identified RE as a time-frequency resource location that is not allowed to be used when the one cell performs the CoMP.

4. The method of claim 2, wherein the setting of the indication further comprises:

setting the indication as one bit in the PDCCH delivered to a serving cell, setting the one bit as a valid state when the cells for currently transmitting data to the UE only include the serving cell, and setting the one bit as an invalid state when the cells for currently transmitting data to the UE do not only include the serving cell.

5. The method of claim 4, wherein the determination of the update mapping patterns for the cells selected from the range setting group performing the CoMP comprises:

taking an original mapping pattern of the serving cell as an update mapping pattern used when the serving cell performs the CoMP when the cells for currently transmitting data to the UE only include the serving cell, and, when the cells for currently transmitting data to the UE do not only include the serving cell, for any one of the cells selected from the range setting group;

identifying a resource element (RE) corresponding to mapping locations of a cell-specific reference signal (CRS) and a channel state information reference signal (CSI-RS) in the original mapping patterns of all cells of the range setting group in an original mapping pattern of the RS for the one cell; and acquiring the update mapping pattern of the RS by taking the identified RE as a time-frequency resource location that is not allowed to be used when the one cell performs the CoMP.

6. The method of claim 2, wherein the setting of the indication further comprises:

setting the indication in the PDCCH delivered to a serving cell, the indication being used for identifying a subgroup to which cells for currently transmitting data to the UE belong, and the subgroup being a class classified according to cell-specific reference signal (CRS) mapping patterns regulated in a system.

7. The method of claim 6, wherein the setting of the indication in the PDCCH delivered to the serving cell comprises:

setting, by the network side, six subgroups according to six types of CRS mapping patterns regulated in the system, and setting an indication of six bits of which each bit corresponds to a subgroup;

for each bit, setting the bit as a valid state when there is a subgroup corresponding to the bit in a set composed of the cells for currently transmitting data to the UE, and setting the bit as an invalid state when there is not a subgroup corresponding to the bit in the set composed of the cells for currently transmitting data to the UE; and adding the indication to the PDCCH delivered to the serving cell.

8. The method of claim 6, wherein the setting of the indication in the PDCCH delivered to the serving cell comprises:

setting, by the network side, three subgroups according to three effective CRS mapping patterns regulated in the system, and setting an indication of three bits of which each bit corresponds to a subgroup;

for each bit, setting the bit as a valid state when there is a subgroup corresponding to the bit in a set composed of the cells for currently transmitting data to the UE, and setting the bit as an invalid state where there is not a subgroup corresponding to the bit in the set composed of the cells for currently transmitting data to the UE; and adding the indication to the PDCCH delivered to the serving cell.

9. The method of claim 6, wherein the setting of the indication in the PDCCH delivered to the serving cell comprises:

setting, by the network side, three subgroups according to three effective CRS mapping patterns regulated in the system, and setting an indication of two bits, of which each bit corresponds to one of other two subgroups apart from the subgroup to which the serving cell belongs;

for each bit, setting the bit as a valid state when there is a subgroup corresponding to the bit in a set composed of the cells for currently transmitting data to the UE, and setting the bit as an invalid state when there is not a subgroup corresponding to the bit in the set composed of the cells for currently transmitting data to the UE; and adding the indication to the PDCCH delivered to the serving cell.

10. The method of claim 6, wherein the setting of the indication in the PDCCH delivered to the serving cell comprises:
setting, by the network side, six subgroups according to six types of CRS mapping patterns regulated in the system, or setting three subgroups according to three effective CRS mapping patterns regulated in the system, and setting an indication of one bit;
setting the one bit as a valid state when the cells for currently transmitting data to the UE and the serving cell belong to a same subgroup, and setting the one bit as an invalid state when the cells for currently transmitting data to the UE and the serving cell do not belong to the same subgroup; and
adding the indication to the PDCCH delivered to the serving cell.

11. An apparatus for implementing a coordinated multiple point transmission (CoMP), comprising a processor and instructions stored in a memory, wherein an execution of the instructions by the processor cause the apparatus to implement:
an original setting module configured to configure a range setting group to a user equipment (UE), and to acquire original mapping patterns of a reference signal (RS) corresponding to a plurality of cells in the range setting group based on identification (ID) of the plurality of cells;
a channel information receiving module configured to receive channel information of the plurality of cells in the range setting group transmitted by the UE; and
a mapping pattern update transmit module configured to select cells for transmitting data to the UE currently, to determine update mapping patterns for the selected cells based on the acquired original mapping patterns of the RS, and to transmit the data on a physical downlink shared channel (PDSCH) to the UE based on the determined update mapping patterns for the selected cells,
wherein the update mapping patterns for the selected cells are identical to each other,
wherein the update mapping patterns is determined to comprise at least one resource element (RE) corresponding to mapping locations of a cell-specific reference signal (CRS) and a channel state information reference signal (CSI-RS) in the original mapping patterns, and the at least one RE is not used for transmitting data, and
wherein the execution of the instructions further cause the mapping pattern update transmit module to implement:
an indication setting unit configured to set an indication in a physical downlink control channel (PDCCH) delivered to a serving cell, the indication associated with whether the cells for transmitting data to the UE comprise only the serving cell or not.

12. The apparatus of claim 11, wherein the execution of the instructions further cause the original setting module to implement:
an identification delivering unit configured to deliver cell identifications of the plurality of cells included in the range setting group to the UE;
a corresponding relation saving unit configured to save a preset corresponding relation between the cell identification and the original mapping patterns of the plurality of cells, and to provide the preset corresponding relation to an original mapping pattern acquiring unit; and
the original mapping pattern acquiring unit configured to acquire the original mapping patterns of the plurality of cells according to the preset corresponding relation saved in the corresponding relation saving unit.

13. The apparatus of claim 12, wherein the execution of the instructions further cause the mapping pattern update transmit module to implement:
a cell selecting unit configured to select the cells for currently transmitting data to the UE from the range setting group;
a pattern update unit configured to identify the resource element (RE) corresponding to mapping locations of the cell-specific reference signal (CRS) and the channel state information reference signal (CSI-RS) in the original mapping patterns the RS for the one cell, and to acquire an update mapping pattern for the RS by taking the identified RE as a time-frequency resource location that is not allowed to be used when the one cell performs the CoMP; and
a transmit unit configured to control the selected cells to transmit a physical downlink shared channel to the UE according to the update mapping pattern.

14. The apparatus of claim 12, wherein
the indication setting unit is further configured to set the indication of one bit in the PDCCH delivered to the serving cell, to set the one bit as a valid state when the cells for currently transmitting data to the UE only include the serving cell, and to set the one bit as an invalid state when the cells for currently transmitting data to the UE do not only include the serving cell.

15. The apparatus of claim 14, wherein the execution of the instructions further cause the mapping pattern update transmit module to implement:
a cell selecting unit configured to select the cells for currently transmitting data to the UE from the range setting group;
a pattern update unit configured to:
determine whether the cells for currently transmitting data to the UE only include the serving cell,
if the cells for currently transmitting data to the UE only include the serving cell, take an original mapping pattern of the serving cell as an update mapping pattern used when the serving cell performs the CoMP,
when the cells for currently transmitting data to the UE do not only include the service cell, for any one of the cells selected from the range setting group, identifying a resource element (RE) corresponding to mapping locations of a cell-specific reference signal (CRS) and a channel state information reference signal (CSI-RS) in the original mapping pattern of the RS for all cells of the range setting group in an original mapping pattern of the one cell, and
acquire the update mapping pattern of the RS by taking the identified RE as a time-frequency resource location that is not allowed to be used when the one cell performs the CoMP, and
a transmit unit configured to control the selected cells to transmit a physical downlink shared channel to the UE according to the update mapping pattern.

16. The apparatus of claim 12, wherein the
indication setting unit is further configured to set the indication in the PDCCH delivered to the serving cell as an indication being used for identifying a subgroup to which cells for currently transmitting data to the UE belong, and the subgroup being a class classified according to cell-specific reference signal (CRS) mapping patterns regulated in a system.

17. The apparatus of claim 16, wherein the execution of the instructions further cause the indication setting unit to implement:
   a subgroup setting subunit configured to set six subgroups according to six types of CRS mapping patterns regulated in the system, and to set an indication of six bits, of which each bit corresponds to one subgroup;
   a bit setting subunit configured to, for each bit set by the subgroup setting subunit, set the bit as a valid state when there is a subgroup corresponding to the bit in a set composed of the cells for currently transmitting data to the UE, and to set the bit as an invalid state when there is not a subgroup corresponding to the bit in the set composed of the cells for currently transmitting data to the UE; and
   an indication adding subunit configured to add the indication to the PDCCH delivered to the serving cell.

18. The apparatus of claim 16, wherein the execution of the instructions further cause the indication setting unit to implement:
   a subgroup setting subunit configured to set three subgroups according to three effective CRS mapping patterns regulated in the system, and to set an indication of three bits, of which each bit corresponds to one subgroup;
   a bit setting subunit configured to, for each bit set by the subgroup setting subunit, set the bit as a valid state when there is a subgroup corresponding to the bit in a set composed of the cells for currently transmitting data to the UE, and to set the bit as an invalid state when there is not a subgroup corresponding to the bit in the set composed of the cells for currently transmitting data to the UE; and
   an indication adding subunit configured to add the indication to the PDCCH delivered to the serving cell.

19. The apparatus of claim 16, wherein the execution of the instructions further cause the indication setting unit to implement:
   a subgroup setting subunit configured to set three subgroups according to three effective CRS mapping patterns regulated in the system, and to set an indication of two bits, of which each bit corresponds to one of other two subgroups apart from the subgroup to which the serving cell belongs;
   a bit setting subunit configured to, for each bit set by the subgroup setting subunit, set the bit as a valid state when there is a subgroup corresponding to the bit in a set composed of the cells for currently transmitting data to the UE, and to set the bit as an invalid state when there is not a subgroup corresponding to the bit in the set composed of the cells for currently transmitting data to the UE; and
   an indication adding subunit configured to add the indication to the PDCCH delivered to the serving cell.

20. The apparatus of claim 16, wherein the execution of the instructions further cause the indication setting unit to implement:
   a subgroup setting subunit configured to set six subgroups according to six types of CRS mapping patterns regulated in the system, or set three subgroups according to three effective CRS mapping patterns regulated in the system, and to set an indication of one bit;
   a bit setting subunit configured to set the one bit as a valid state when the cells for currently transmitting data to the UE and the serving cell belong to a same subgroup, and to set the one bit as an invalid state when the cells for currently transmitting data to the UE and the serving cell do not belong to the same subgroup; and
   an indication adding subunit configured to add the indication to the PDCCH delivered to the serving cell.

* * * * *